US011619994B1

(12) United States Patent
Bhat et al.

(10) Patent No.: US 11,619,994 B1
(45) Date of Patent: Apr. 4, 2023

(54) CONTROL OF AN ELECTRONIC CONTACT LENS USING PITCH-BASED EYE GESTURES (71) Applicant: Tectus Corporation, Saratoga, CA (US)

(72) Inventors: Abhishek Deepak Bhat, Santa Clara, CA (US); Dominic Philip Haine, Burlingame, CA (US); Ben Rafael Kimel Green, Alameda, CA (US); Ramin Mirjalili, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 17/576,121

(22) Filed: Jan. 14, 2022

(51) Int. Cl.
*G06F 3/01* (2006.01)
*G02C 7/04* (2006.01)
*G02C 11/00* (2006.01)

(52) U.S. Cl.
CPC .............. *G06F 3/013* (2013.01); *G02C 7/04* (2013.01); *G06F 3/017* (2013.01); *G02C 11/10* (2013.01)

(58) Field of Classification Search
CPC G06F 3/013; G06F 3/017; G02C 7/04; G02C 11/10; G02C 7/083; A61B 3/113; A61B 5/165; A61B 3/10; G01P 15/18
See application file for complete search history.

(56) References Cited

U.S. PATENT DOCUMENTS

| 4,871,247 A | 10/1989 | Haynes |
| 5,844,544 A | 12/1998 | Kahn |
| 6,027,216 A | 2/2000 | Guyton |
| 7,431,458 B2 | 10/2008 | Jongsma |
| 7,542,210 B2 | 6/2009 | Chirieleison, Sr. |
| 7,626,562 B2 | 12/2009 | Iwasaki |

(Continued)

FOREIGN PATENT DOCUMENTS

| CN | 106445115 A | 2/2017 |
| CN | 107092346 A | 8/2017 |

(Continued)

OTHER PUBLICATIONS

Christiansen et al, editors. Motion Sensors Explainer. W3C Working Group Note, Aug. 30, 2017. retrieved from [https://www.w3.org/TR/motion-sensors/] on [Oct. 21, 2021]. (Year: 2017).

(Continued)

*Primary Examiner* — Richard J Hong
(74) *Attorney, Agent, or Firm* — Amsel IP Law PLLC; Jason Amsel (57) ABSTRACT

A system includes an electronic contact lens that can detect eye gestures for initiating various actions. The electronic contact lens includes integrated sensors for obtaining sensor measurements characterizing eye motion. The sensor measurements are processed to detect gestures mapped to specific actions such as changing a power state of the electronic contact lens, activating or deactivating a user interface or other feature, or selecting an item from a virtual menu. The eye gestures may involve the user sequentially stabilizing at a starting pitch, executing a first motion that crosses a first pitch threshold, executing a second motion that crosses a second pitch threshold in an opposite direction from the starting pitch, and stabilizing at an ending pitch.

17 Claims, 10 Drawing Sheets

(56) References Cited

U.S. PATENT DOCUMENTS

| | | |
|---|---|---|
| 8,430,310 B1 | 4/2013 | Ho |
| 8,446,341 B2 | 5/2013 | Amirparviz |
| 8,520,309 B2 | 8/2013 | Sprague |
| 8,764,185 B1 | 7/2014 | Biederman |
| 8,786,675 B2 | 7/2014 | Deering |
| 8,798,332 B2 | 8/2014 | Otis |
| 8,827,445 B1 | 9/2014 | Wiser |
| 8,870,370 B1 | 10/2014 | Otis |
| 8,874,182 B2 | 10/2014 | Etzkorn |
| 8,890,946 B2 | 11/2014 | Publicover |
| 8,911,087 B2 | 12/2014 | Publicover |
| 8,960,898 B1 | 2/2015 | Etzkorn |
| 8,964,298 B2 | 2/2015 | Haddick |
| 8,971,978 B2 | 3/2015 | Ho |
| 8,989,834 B2 | 3/2015 | Ho |
| 9,028,068 B2 | 5/2015 | Chang |
| 9,040,923 B2 | 5/2015 | Sprague |
| 9,047,512 B2 | 6/2015 | Otis |
| 9,052,533 B2 | 6/2015 | Pugh |
| 9,111,473 B1 | 8/2015 | Ho |
| 9,153,074 B2 | 10/2015 | Zhou |
| 9,170,646 B2 | 10/2015 | Toner |
| 9,196,094 B2 | 11/2015 | Ur |
| 9,215,293 B2 | 12/2015 | Miller |
| 9,298,002 B2 | 3/2016 | Border |
| 9,298,020 B1 | 3/2016 | Etzkorn |
| 9,341,843 B2 | 5/2016 | Border |
| 9,390,326 B2 | 7/2016 | Publicover |
| 9,405,365 B2 | 8/2016 | Publicover |
| 9,600,069 B2 | 3/2017 | Publicover |
| 9,837,052 B2 | 12/2017 | Deering |
| 9,870,060 B2 | 1/2018 | Marggraff |
| 9,921,645 B2 | 3/2018 | Theytaz |
| 10,025,379 B2 | 7/2018 | Drake |
| 10,178,367 B2 | 1/2019 | Zhou |
| 10,345,621 B2 | 7/2019 | Franklin |
| 10,353,463 B2 | 7/2019 | Shtukater |
| 10,718,957 B2 | 7/2020 | Wiemer |
| 10,901,505 B1 | 1/2021 | Haine |
| 2004/0155907 A1 | 8/2004 | Yamaguchi |
| 2009/0066722 A1 | 3/2009 | Kriger |
| 2010/0231504 A1 | 9/2010 | Bloem |
| 2011/0077548 A1* | 3/2011 | Torch .............. A61B 5/165 |
| | | 600/558 |
| 2011/0221659 A1 | 9/2011 | King, III |
| 2013/0145304 A1 | 6/2013 | Deluca |
| 2013/0258287 A1* | 10/2013 | Pugh .............. A61B 3/113 |
| | | 351/210 |
| 2014/0063054 A1 | 3/2014 | Osterhout |
| 2014/0081178 A1* | 3/2014 | Pletcher .............. A61B 3/10 |
| | | 600/595 |
| 2014/0098226 A1 | 4/2014 | Pletcher |
| 2014/0168056 A1 | 6/2014 | Swaminathan |
| 2014/0198128 A1 | 7/2014 | Hong |
| 2014/0243971 A1 | 8/2014 | Pugh |
| 2014/0268029 A1 | 9/2014 | Pugh |
| 2014/0347265 A1 | 11/2014 | Aimone |
| 2014/0354539 A1 | 12/2014 | Skogö |
| 2015/0049004 A1 | 2/2015 | Deering |
| 2015/0143234 A1 | 5/2015 | Norris, III |
| 2015/0192992 A1 | 7/2015 | Di Censo |
| 2015/0205106 A1 | 7/2015 | Norden |
| 2015/0212576 A1 | 7/2015 | Ambrus |
| 2015/0235439 A1 | 8/2015 | Schowengerdt |
| 2015/0235440 A1 | 8/2015 | Schowengerdt |
| 2015/0235444 A1 | 8/2015 | Schowengerdt |
| 2015/0235446 A1 | 8/2015 | Schowengerdt |
| 2015/0235457 A1 | 8/2015 | Schowengerdt |
| 2015/0235468 A1 | 8/2015 | Schowengerdt |
| 2015/0235471 A1 | 8/2015 | Schowengerdt |
| 2015/0241698 A1 | 8/2015 | Schowengerdt |
| 2015/0243090 A1 | 8/2015 | Schowengerdt |
| 2015/0261294 A1 | 9/2015 | Urbach |
| 2015/0301338 A1 | 10/2015 | Van Heugten |
| 2015/0312560 A1 | 10/2015 | Deering |
| 2015/0338915 A1 | 11/2015 | Publicover |
| 2015/0339857 A1 | 11/2015 | O'Connor |
| 2015/0362749 A1 | 12/2015 | Biederman |
| 2015/0362750 A1* | 12/2015 | Yeager ............ G02C 7/083 |
| | | 351/209 |
| 2015/0362753 A1 | 12/2015 | Pletcher |
| 2016/0011419 A1 | 1/2016 | Gao |
| 2016/0018650 A1 | 1/2016 | Haddick |
| 2016/0018651 A1 | 1/2016 | Haddick |
| 2016/0018652 A1 | 1/2016 | Haddick |
| 2016/0018653 A1 | 1/2016 | Haddick |
| 2016/0025981 A1 | 1/2016 | Burns |
| 2016/0091737 A1 | 3/2016 | Kim |
| 2016/0097940 A1 | 4/2016 | Sako |
| 2016/0133201 A1 | 5/2016 | Border |
| 2016/0195924 A1 | 7/2016 | Weber |
| 2016/0253831 A1 | 9/2016 | Schwarz |
| 2016/0274660 A1 | 9/2016 | Publicover |
| 2016/0283595 A1 | 9/2016 | Folkens |
| 2016/0299357 A1 | 10/2016 | Hayashi |
| 2017/0019661 A1 | 1/2017 | Deering |
| 2017/0023793 A1 | 1/2017 | Shtukater |
| 2017/0111619 A1 | 4/2017 | Benosman |
| 2017/0115742 A1 | 4/2017 | Xing |
| 2017/0116897 A1 | 4/2017 | Ahn |
| 2017/0123492 A1 | 5/2017 | Marggraff |
| 2017/0131764 A1 | 5/2017 | Bognar |
| 2017/0177078 A1 | 6/2017 | Henderek |
| 2017/0270636 A1 | 9/2017 | Shtukater |
| 2017/0285742 A1 | 10/2017 | Marggraff |
| 2017/0371184 A1 | 12/2017 | Shtukater |
| 2018/0120568 A1 | 5/2018 | Miller |
| 2018/0149884 A1 | 5/2018 | Miller |
| 2018/0173011 A1 | 6/2018 | Barrows |
| 2018/0180980 A1 | 6/2018 | Ouderkirk |
| 2018/0275753 A1 | 9/2018 | Publicover |
| 2018/0335835 A1 | 11/2018 | Lemoff |
| 2018/0348969 A1 | 12/2018 | Kawamura |
| 2019/0025607 A1 | 1/2019 | Liao |
| 2019/0025608 A1 | 1/2019 | Liao |
| 2019/0056785 A1 | 2/2019 | Suk |
| 2019/0107734 A1* | 4/2019 | Lee ............ G02C 7/04 |
| 2019/0235276 A1 | 8/2019 | Wiemer |
| 2019/0235624 A1 | 8/2019 | Goldberg |
| 2019/0250408 A1 | 8/2019 | Lafon |
| 2019/0250432 A1 | 8/2019 | Kim |
| 2019/0307399 A1* | 10/2019 | Gutierrez ............ G02C 7/083 |
| 2019/0377428 A1 | 12/2019 | Mirjalili |
| 2019/0390976 A1 | 12/2019 | Anderson |
| 2020/0073122 A1 | 3/2020 | Rothkopf |
| 2020/0096786 A1* | 3/2020 | Toner .............. G01P 15/18 |
| 2021/0026444 A1 | 1/2021 | Haine |
| 2021/0072821 A1 | 3/2021 | von und zu Liechtenstein |
| 2021/0124415 A1 | 4/2021 | Haine |
| 2021/0208674 A1 | 7/2021 | Haine |
| 2022/0046156 A1 | 2/2022 | Lemoff |
| 2022/0121344 A1 | 4/2022 | Pastrana Vicente |

FOREIGN PATENT DOCUMENTS

| | | |
|---|---|---|
| WO | 2006015315 A2 | 2/2006 |
| WO | 2016195201 A1 | 12/2016 |
| WO | 2018109570 | 6/2018 |

OTHER PUBLICATIONS

CN107092346A English translation (Year: 2017).
International Search Report and Written Opinion for Application No. PCT/US2019/015338, dated Apr. 11, 2019, 15 pages.
International Search Report and Written Opinion in PCT/US2020/056376, dated Jan. 12, 2021, 10 pages.
Ioannou, S. et al., "Proximity and Gaze Influences Facial Temperature: A Thermal Infrared Imaging Study," Frontiers in Psychology, Aug. 2014, pp. 1-12, vol. 5, Article 845.
ITMO University. New femto-camera with quadrillion fractions of a second resolution. Eureka Alert. Jun. 21, 2017. [Retrieved Mar. 18, 2019]. Retrieved from: https://www.eurekalert.org/pub_releases/2017-06/iu-nfw062117.php> entire document (3 pages).

(56) References Cited

OTHER PUBLICATIONS

Kim, J. et al., "3D Multi-Spectrum Sensor System with Face Recognition," Sensors, 2013, p. 12804-12829, vol. 13.
Lingley et al., "Asingle-pixel wireless contact lens display" J. Micromech. Microeng. 21 125014. (Year: 2011), 9 pages.
Liu, Y. et al., "Facial Expression Recognition with Fusion Features Extracted from Salient Facial Areas," Sensors, 2017, pp. 1-18, vol. 17, No. 712.
Lu, J. et al., "A 1 TOPS/W Analog Deep Machine-Learning Engine With Floating-Gate Storage in 0.13ljm CMOS," IEEE Journal of Solid-State Circuits, Jan. 2015, pp. 270-281, vol. 50, No. 1.
Merla, A., "Thermal Expression of Intersubjectivity Offers New Possibilities to Human-Machine and Technologically Mediated Interactions," Frontiers in Psychology, Jul. 2014, pp. 1-6, vol. 5, Article 802.
WO2016195201A1 English translation (Year: 2016).

\* cited by examiner

CONTROL OF AN ELECTRONIC CONTACT LENS USING PITCH-BASED EYE GESTURES

BACKGROUND

1. Technical Field

This disclosure relates generally to controlling an electronic contact lens using eye gestures.

2. Description of Related Art

An electronic contact lens may include various integrated electronic components such as projectors, imaging devices, sensors, and batteries. The electronic contact lens may enable augmented reality applications in which images are projected by the electronic contact lens onto the user's retina to augment the user's view of the external environment. The electronic contact lens may include integrated motion sensors for tracking eye movements that may be used to control various functions of the electronic contact lens.

DETAILED DESCRIPTION

A system includes an electronic contact lens that can detect eye gestures for initiating various actions. The electronic contact lens includes integrated sensors for obtaining sensor measurements characterizing eye motion. The sensor measurements are processed to detect gestures mapped to specific actions such as changing a power state of the electronic contact lens, activating or deactivating a user interface or other feature, or selecting an item from a virtual menu.

To provide a quality user experience, eye gestures should be detectable with low rates of false positives. For example, it is desirable for the electronic contact lens system to consistently distinguish between intentional eye gestures and other eye or head movements that are not intended to invoke an action. Furthermore, it is desirable to utilize eye gestures that are detectable with low rates of false negatives and that are easy for a user to perform consistently.

An example class of eye gestures that meets the above characteristics involves the user initiating the gesture by pausing the eye at a starting pitch, executing a first change in eye pitch in a first direction, executing a second change in eye pitch in the opposite direction, and then again pausing the eye to complete the gesture. The eye gesture may furthermore be subject to various motion and timing constraints. For example, in one embodiment, a gesture may be deemed valid only if (1) the eye motion crosses a first pitch threshold in a first direction from the starting pitch and subsequently crosses a second pitch threshold in an opposite direction from the starting pitch; (2) the eye motion achieves a span (i.e., total change in pitch) that exceeds a minimum span threshold; and (3) the different aspects of the motion are performed within a set of configured timing constraints. In another embodiment, different motion segments are individually scored against respective target criteria, and the scores are combined and evaluated to holistically determine whether the motion is a valid gesture. In this embodiment, failure to meet an individual criterion does not necessarily invalidate the gesture. The electronic contact lens system can be programmed to invoke different actions depending on the type and direction of the detected eye gesture.

Figure 1A:
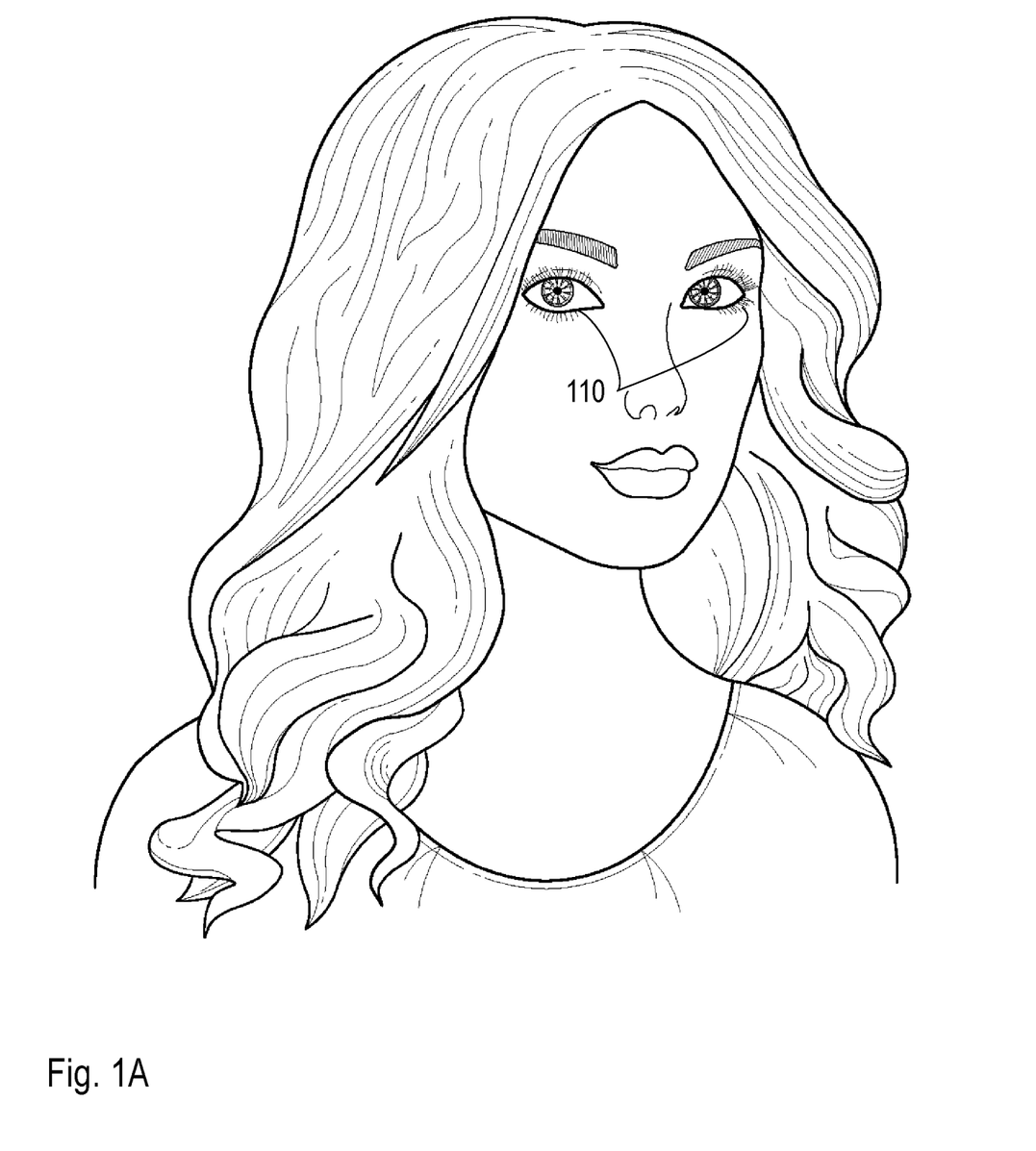
FIG. 1A shows a user wearing an electronic contact lens.
Figure 1B:
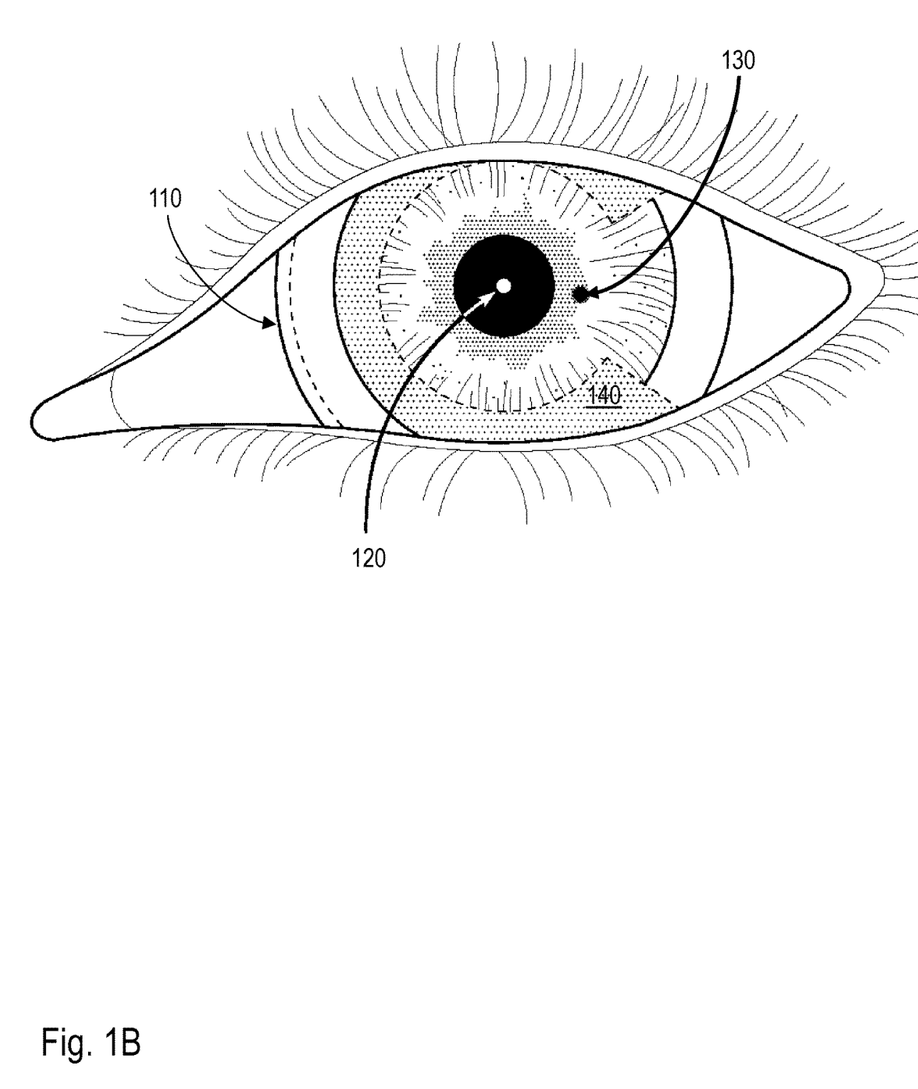
FIG. 1B shows a magnified and simplified view of the electronic contact lens mounted on the user's eye.
Figure 1C:
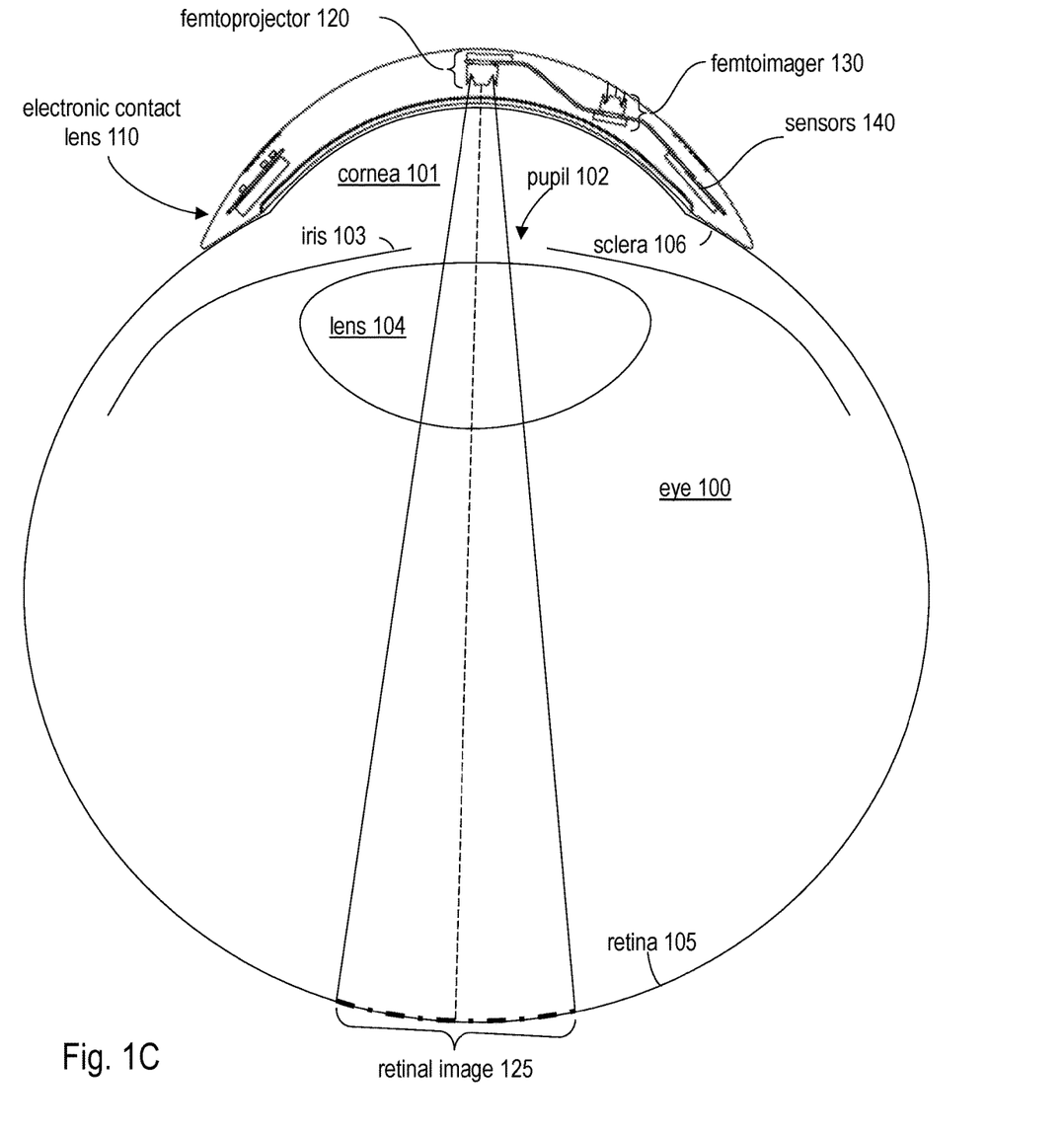
FIG. 1C shows a cross sectional view of the electronic contact lens mounted on the user's eye.

FIG. 1A shows a user wearing a pair of electronic contact lenses 110. In other instances, the user may wear only a single electronic contact lens 110 in just one eye. FIG. 1B shows a magnified view of an electronic contact lens 110, and FIG. 1C shows a cross sectional view of the electronic contact lens 110. The following examples use a scleral contact lens in which the contact lens is supported by the sclera of the user's eye, but the contact lens does not have to be scleral.

As shown in FIG. 1B, the electronic contact lens 110 contains a femtoprojector 120, a femtoimager 130, and sensors 140. The femtoprojector 120 and femtoimager 130 are optional, and in other embodiments, the electronic contact lens 110 may omit these components.

The optional femtoprojector 120 is a small projector that projects images inward onto the user's retina. It is located in a central region of the contact lens 110, so that light from the femtoprojector 120 propagates through the user's pupil to the retina. The femtoprojector 120 typically includes an electronics backplane (e.g., driver circuitry), a front plane of light emitting elements (e.g., an LED array) and projection optics. The front plane produces an image (referred to as the source image), which is optically projected by the projection optics through the various eye structures and onto the retina 105, as shown in FIG. 1C.

The optional femtoimager 130 is a small imager that is outward facing and captures images of the external environment. In this example, it is located outside the central region of the contact lens 110 so that it does not block light from entering the user's eye. The femtoimager 130 typically includes imaging optics, a sensor array, and sensor circuitry. The imaging optics images a portion of the external environment onto the sensor array, which captures the image. The sensor array may be an array of photosensors.

The femtoprojector 120 and femtoimager 130 typically are not larger than 2 mm wide. They may fit within a 2 mm×2 mm×2 mm volume. In an embodiment, the electronic contact lens 110 has a thickness that is less than two millimeters.

The sensors 140 and other associated electronics may be mounted on a flexible bus located in a peripheral zone of the electronic contact lens 110. The sensors 140 may include motion sensors such as an accelerometer and a gyroscope. The sensors 140 may furthermore include a magnetometer and additional sensors such as temperature sensors, light sensors, and audio sensors. Sensed data from the sensors 140 may be combined to estimate position, velocity, acceleration, orientation, angular velocity, angular acceleration or other motion parameters of the eye. For example, in one embodiment, gyroscope data, magnetometer data, and accelerometer data may be combined in a filter to estimate the orientations. Furthermore, gyroscope measurements may be compensated for variations in temperature.

The electronic contact lens 110 may furthermore include various other electronic components (not shown) such as a radio transceiver, power circuitry, an antenna, a battery, or inductive charging coils. The electronic contact lens 110 may also include cosmetic elements, for example covering the sensors 140 or other electronic components. The cosmetic elements may be surfaces colored to resemble the iris and/or sclera of the user's eye.

FIG. 1C shows a cross sectional view of the electronic contact lens mounted on the user's eye. FIG. 1C illustrates some structures of the eye 100 including the cornea 101, pupil 102, iris 103, lens 104, retina 105, and sclera 106. The contact lens 110 maintains eye health by permitting oxygen to reach the cornea 101.

As shown in FIG. 1C, the optional femtoimager 130 is outward-facing, so that it captures images of the surrounding environment, while the optional femtoprojector 120 is inward-facing and projects an image 125 onto the user's retina 105. The femtoimager 130, femtoprojector 120, and sensors 140 all move together with the eye 100 because the electronic contact lens 110 is physically mounted to the eye 100. Thus, the sensors 140 naturally capture motion of the eye. Furthermore, images captured by the femtoimager 130 naturally have a line of sight corresponding to the user's gaze direction and virtual images projected by the femtoprojector 120 naturally move together with the eye 100.

Figure 2:
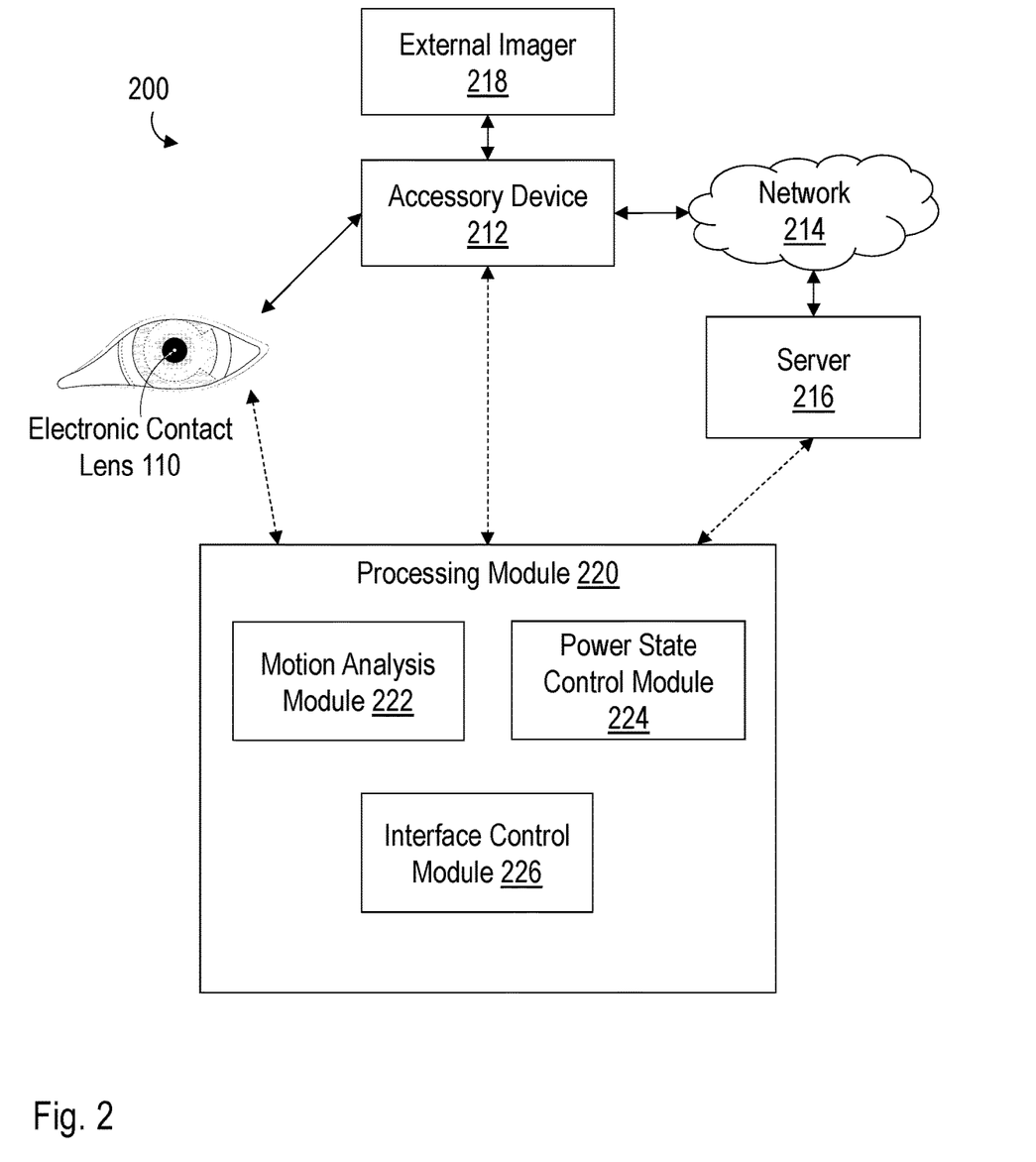
FIG. 2 is a block diagram of an electronic contact lens system.

FIG. 2 shows a block diagram of an electronic contact lens system 200. The electronic contact lens system 200 includes the electronic contact lens 110, as described above, an accessory device 212, a network 214, a server 216, and an optional external imager 218. The accessory device 212 is a computing device that is communicatively coupled to the electronic contact lens 110 (e.g., via a wireless interface) and performs computing or storage functions that support operation of the electronic contact lens 110. The accessory device 212 may be embodied as an electronic wearable device (e.g., necklace, headband, waistband, etc.), smartphone, smart-watch or another device. The accessory device 212 may also be connected to a server 216 via a network 214. The server 216 provides access to various information relevant to operation of the electronic contact lens 110 and may furthermore provide additional computing or storage functions that support operation of the electronic contact lens 110. The external imager 218, if present, captures images of the external environment and may be used to supplement images captured by the optional femtoimager 130 of the electronic contact lenses 110. The external imager 218 may capture images having a wider field of view, higher resolution or other improved image characteristics relative to the images captured by the femtoimager 130.

A processing module 220 interfaces with the electronic contact lens 110 to track motion data of the electronic contact lens, detect eye gestures, and initiate actions responsive to the detected eye gestures. The processing module 220 may furthermore perform other functions of the electronic contact lens 110 such as generating virtual images for display using the femtoprojector 120, processing images obtains from the femtoimager 130, or other tasks.

Various components of the processing module 220 may be implemented in whole or in part in the electronic contact lens 110, the accessory device 212, the server 216, or a combination thereof. In some implementations, certain time-sensitive functions of the processing module 220 may be implemented directly on the electronic contact lenses 110 for low latency while other more computationally intensive functions may be offloaded to the accessory device 212 or to the server 216 to enable the electronic contact lens 110 to operate with relatively light computational and storage requirements. For example, in one implementation, the electronic contact lens 110 transfers the raw sensor data to the accessory device 212 for processing. The accessory device 212 may process the data directly or may offload one or more functions in whole or in part to the server 216. Alternatively, the electronic contact lens 110 may perform some lightweight initial processing on the sensor data and send the initially processed sensor data to the accessory device 212. For example, the electronic contact lens 110 may perform some filtering or compression of the sensor data. Responsibility for other tasks such as generating virtual images and processing captured image data may similarly be shared between the electronic contact lenses 110, accessory device 212, and server 216 in different ways.

The processing module 220 includes a motion analysis module 222, a power state control module 224, and an interface control module 226. Other embodiments may include different, additional, or fewer components.

The motion analysis module 222 processes sensor measurements from the electronic contact lens 110 to detect occurrences of one or more eye gestures. Here, the motion analysis module 222 may apply various filters and/or functions to the raw sensor data (e.g., from the accelerometer, gyroscope, magnetometer, or other sensors) to detect a sequence of movements consistent with a predefined eye gesture.

In an embodiment, the sensor measurements processed by the motion analysis module 222 may include image data from the femtoimager 130. Here, for example, the motion analysis module 222 may perform image-based motion analysis techniques on images captured from the femtoimager 130 over time that may be used alone or in conjunction with other sensor data to estimate changes in eye orientation and detect eye gestures.

In an embodiment, the motion analysis module 222 may optionally obtain and analyze sensor data from sensors external to an electronic contact lens 110. For example, head-mounted sensors or external cameras may be used to track head position. The motion analysis module 222 may utilize this data to estimate gaze orientation relative to the head (e.g., whether the gaze position is centered or at a peripheral region).

In an example implementation, the motion analysis module 222 comprises a state machine having a sequence of states that each correspond to one of the motion segments of the eye gesture. Beginning at a starting state corresponding to a first motion segment, the state machine compares motion data in a recent time window to motion criteria defining the first motion segment. The state machine progresses to the next state when the detected motion is consistent with the first motion segment. In the next state, a different set of criteria is applied to a subsequent time window of motion data to determine if the motion data in the subsequent time window is consistent with the next defined motion segment of the eye gesture. The state machine continues to progress in this matter as each segment of the eye gesture is detected. Otherwise, if the detected motion at any given state is inconsistent with the defined motion segment for that state, the state machine returns to the starting state.

In an embodiment, each stage of the state machine determines whether or not the criteria associated with that motion segment are met. In this case, an eye gesture is detected when the state machine reaches the end state, indicating that the full set of motion segments are sequentially detected according to their respective criteria.

In another embodiment, the motion analysis module 222 compares the motion against two different sets of criteria at each stage of the state machine. First, the motion analysis module 222 compares the motion against state transition criteria that represents the minimum criteria for transitioning to the next state. Second, the motion analysis module 222 compares the motion against target criteria to generate as core indicating how closely the motion conforms to a target motion. The state transition criteria may be more relaxed than the target criteria. The scores may then be combined (e.g., as a sum, weighted sum, or weighted average) and a gesture is detected if the total score exceeds a threshold. In this case, reaching the final state of the state machine does not necessarily indicate a detection of the gesture since it may be possible to reach the final state based on the state transition criteria without achieving a total score sufficient to detect the gesture.

In an embodiment, the motion analysis module 222 may comprise two or more state machines executing in parallel. Here, when one state machine advances past the initial state, another state machine may initiate in the initial state to determine if a subsequent eye movement corresponds to the first motion segment. This embodiment ensures that the start of the gesture is not missed when the initial state machine advances past the initial state but fails to detect later motion segments of an eye gesture.

For each state of the state machine, the motion criteria may be defined positively (i.e., the state machine progresses when the specified criteria for the current state are met), negatively (i.e., the state machine is reset to the starting state when the criteria for the current state are met), or as a combination thereof. The criteria for detecting each motion segment of the eye gesture may be based on factors such as changes in orientation, velocity, or acceleration associated with movements, durations of time associated with movements or in between movements, or other factors that collectively describe a detectable eye gesture. In other embodiments, the criteria for each state may be defined in terms of specific types of detectable eye movements (such as saccades, microsaccades, smooth pursuits, drifts, fixations, etc.) and characteristics of those movements. Specific examples of eye gestures and techniques for detecting them are described in further detail below with respect to FIGS. 3-7.

In other embodiments, the motion analysis module 222 detects a gesture without necessarily using a state machine. For example, in another implementation, the motion analysis module 222 obtains a set of samples associated with a time window and independently characterizes the motion in each of a sub-windows. The characterized motions can then be compared against target motions to evaluate whether or not the gesture is detected.

The power state control module 224 controls a power state of the electronic contact lens 110. The power state may be controlled, at least in part, in response to a detected eye gesture. In an embodiment, the electronic contact lens 110 can operate in at least a low power state and a full power state. In some embodiments, additional power states may be available. In the low power state, the electronic contact lens 110 operates with limited functionality to conserve power. In one example implementation, the electronic contact lens 110 may enable only functions for detecting a trigger event that causes the electronic contact lens 110 to transition to the full power state. Thus, at least the femtoimager 130 and femtoprojector 120 may be deactivated in the low power state.

In one embodiment, the electronic contact lens 110 furthermore disables the gyroscope in the low power state. In this case, the electronic contact lens 110 uses only the accelerometer and magnetometer data to detect an eye gesture that activates the full power state, which then enables the gyroscope, the femtoimager 130, and femtoprojector 120, or other components. In another embodiment, only the magnetometer is enabled during the lower power state and the accelerometer and other sensors are disabled until the full power state is activated. In embodiments where only the magnetometer and/or accelerometer are active in the low power state, the gesture for activating the full power state may be evaluated based only on changes in pitch detectable by the accelerometer and/or magnetometer, without regard to changes in yaw.

When operating in the full power state, the electronic contact lens 110 may activate a wider set of sensors (e.g., the gyroscope), the femtoimager 130, and/or the femtoprojector 120 to enable various user functions. An eye gesture may furthermore be utilized to transition the electronic contact lens 110 from the full power state back to the low power state.

In other implementations, the power state control module 224 may perform some automatic transitions between power states. For example, if the user is wearing two electronic contact lenses 110, one lens 110 may operate in the low power state described above while the other lens 110 may operate in a sleep state in which it does not track eye motion. When the lens 110 in the low power state detects an eye gesture for transitioning to the full power state, it transitions to the full power state and sends a signal to the other contact lens 110 to cause it to enter the full power state. In an embodiment, the lenses 110 may automatically switch which lens 110 operates in the low power state and which operates in the sleep state. The lenses 110 may switch periodically or based on their relatively battery levels. For example, the lens 110 with the lower battery level may be configured to operate in the sleep state and the lens 110 with the higher battery level operates in the low power state.

The interface control module 226 controls various user functions of the electronic contact lens 110 that may be invoked responsive to a detected eye gesture or other command input (e.g., a voice input). The interface control module 226 may generate a user interface displayed by the femtoprojector 120 including virtual elements that the user may interact with such as virtual objects, text, menus, or other elements. Eye gestures may be detected to initiate actions such as activating or deactivating a virtual menu, selecting an item of a virtual menu, switching between virtual menus, interacting with virtual objects, or controlling settings of the electronic contact lens 110. In an embodiment, different types of eye gestures or performing eye gestures of the same type in different directions may invoke different actions. For example, the direction of the eye gesture may control a position of the user interface display.

In some embodiments, the same eye gesture may be mapped to different functions in different power states. For example, the same eye gesture could be used to transition from the low power state to the full power state and vice versa.

In an embodiment, a pre-activation filter may operate to only initiate detection of a particular type of eye gesture when the electronic contact lens 110 is in a specific state. For example, when the electronic contact lens 110 is in a low power state, it may operate to detect an eye gesture for transitioning to the full power state but does not necessarily operate to detect other types of eye gestures that are only applicable in the full power state. Similarly, when the electronic contact lens 110 is in the full power state, it does not necessarily operate to detect an eye gesture that solely operates to invoke a transition to the full power state.

Figure 3A:
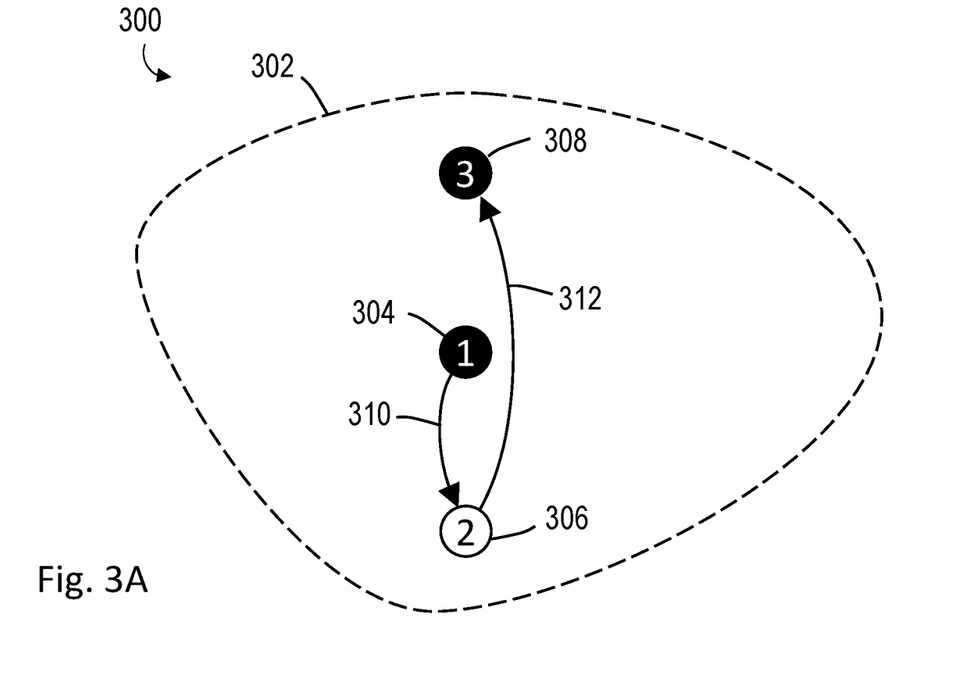
FIG. 3A is a diagram illustrating a first eye gesture detectable by an electronic contact lens system.

FIG. 3A illustrates a first example of an eye gesture 300. In the illustrated diagram, the dashed line 302 represents the approximate extent of the eye range of motion relative to the head as defined by a sensor position or an otherwise tracked surface position of the eye. The filled circles at positions 304, 308 indicate positions where the user executes a pause in eye movement. The open circle at position 306 represents a pause of typically shorter duration than the pauses at positions 304, 308 represented by the filled circles. The numbers in the circles at these positions 304, 306, 308 indicate the sequential order of these positions when the gesture 300 is performed. The arrows 310, 312 also indicate the order of the motions but do not necessarily represent any specific required trajectory between the positions 304, 306, 308.

In the example gesture 300, the user first pauses at an initial position 304, then executes a first motion 310 to the second position 306 (e.g., near a bottom edge of the range 302), then executes a second motion 312 to the third position 308 (e.g., near a top edge of the range 302). The shorter duration of the pause at position 306 may be consistent with a user attempting to transition between the motions quickly (i.e., without deliberately trying to stabilize the eye at position 306), while durations of the pauses at positions 304, 308 may be consistent with deliberate pauses at these positions.

In the illustrated example, the pitch of the starting position 304 is in between the pitches of the second position 306 and third position 308, i.e., $p_2 < p_1 < p_3$ where $p_1$, $p_2$, and $p_3$ are the pitches of the first position 304, second position 306, and third position 308 respectively.

Figure 3B:
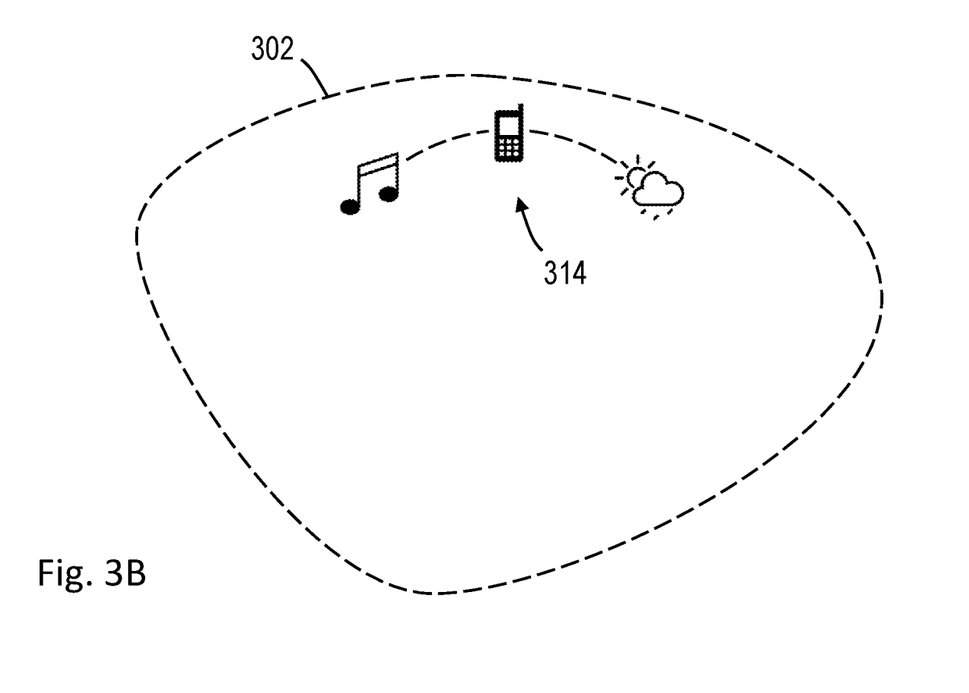
FIG. 3B is a diagram illustrating an example user interface displayed in response to detecting the first eye gesture.

FIG. 3B illustrates an example embodiment of a user interface 314 that may be displayed (e.g., using the femto-projector 120) in response to detecting the gesture 300 of FIG. 3A. In this example, the user interface comprises a set of icons appearing along a top peripheral edge of the range 302 (i.e., in the vicinity of the ending position 308). As described above, detection of the gesture 300 could also cause a change in power state (e.g., from a low power state to a full power state), or other action.

Figure 4A:
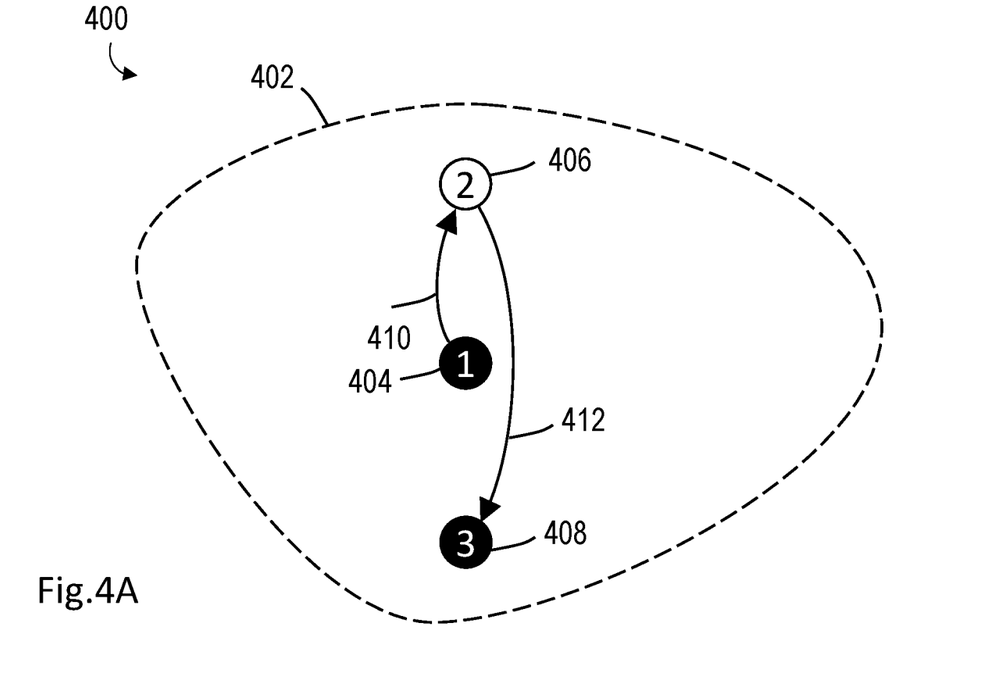
FIG. 4A is a diagram illustrating a second eye gesture detectable by an electronic contact lens system.

FIG. 4A illustrates another example of an eye gesture 400. This eye gesture 400 is similar to the eye gesture 300 of FIG. 3A but is performed in the opposite direction. Thus, in this gesture 400, the eye pauses at a starting position 404, executes a first motion 410 to a second position 406 (e.g., near a top edge of the range 402), execute a second motion 412 to a third position 408 (e.g., near the bottom edge of the range 402), and pauses at the third position 408. In this case, the pitch of the starting position 404 is in between the pitches of the second position 406 and third position 408 and $p_3 < p_1 < p_2$ where $p_1$, $p_2$, and $p_3$ are the pitches of the first position 404, second position 406, and third position 408 respectively.

Figure 4B:
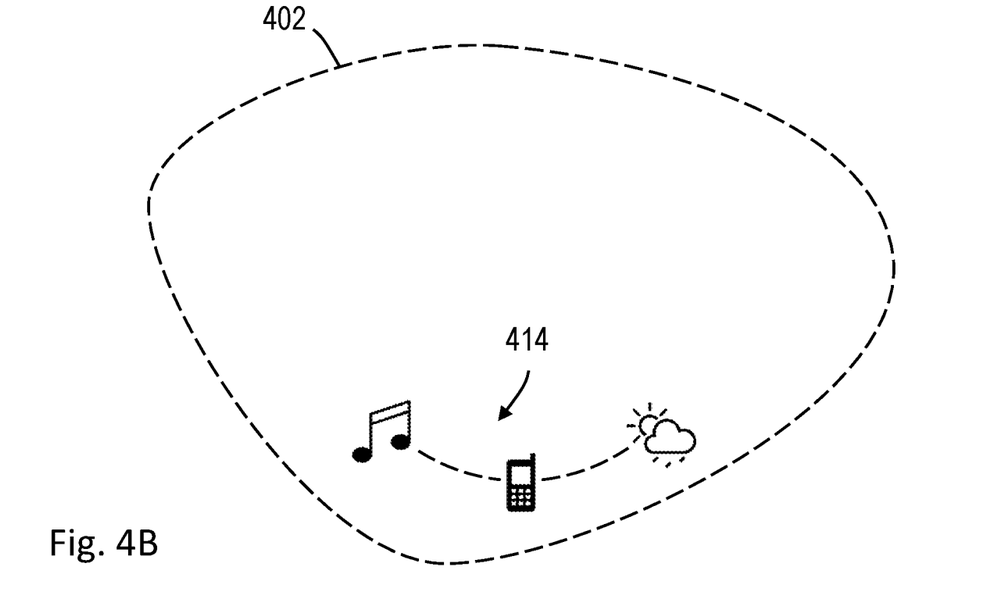
FIG. 4B is a diagram illustrating an example user interface displayed in response to detecting the second eye gesture.

FIG. 4B illustrates an example embodiment of a user interface 414 that may be displayed (e.g., using the femto-projector 120) in response to detecting the gesture 400 of FIG. 4A. In this example, the user interface 414 comprises a set of icons appearing along a bottom peripheral edge of the range 402 (i.e., in the vicinity of the ending position 408). As described above, detection of the gesture could also cause a change in power state (e.g., from a low power state to a full power state), or other action.

As illustrated, the gestures 300, 400 of FIGS. 3A, 4A are substantially identical but occur in opposite directions. The direction thus controls where the user interface icons 314, 414 appear when the gesture 300, 400 is detected. In alternative embodiments, the user interface icons 314, 414 may appear in the same position regardless of the direction of the gesture 300, 400.

Figure 5:
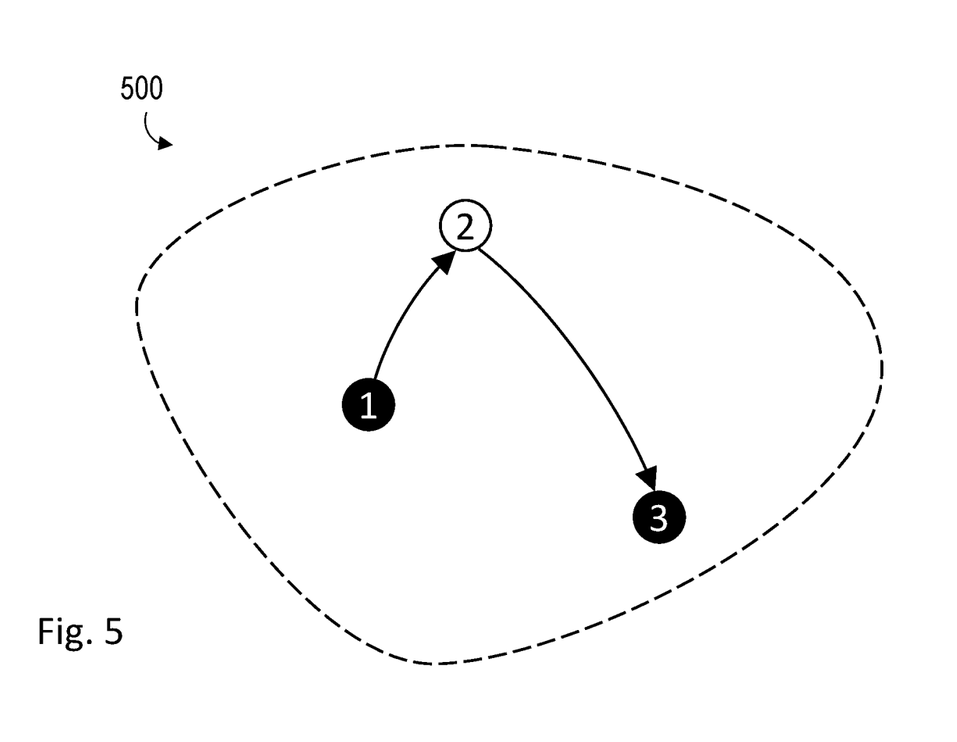
FIG. 5 is a diagram illustrating a third eye gesture detectable by an electronic contact lens system.

In an embodiment, the eye gestures 300, 400 of FIGS. 3A, 4A are detected based only on the changes in pitch regardless of any changes in yaw or roll. For example, FIG. 5 illustrates an eye gesture involving substantially the same changes in pitch as the example of FIG. 4A, but with different change in yaw. This gesture may have the same effect as the gesture in FIG. 4A (e.g., resulting in activating the user interface of FIG. 4B) because the motion analysis module 202 detects the gestures 400, 500 based only on the changes in pitch.

Figure 6:
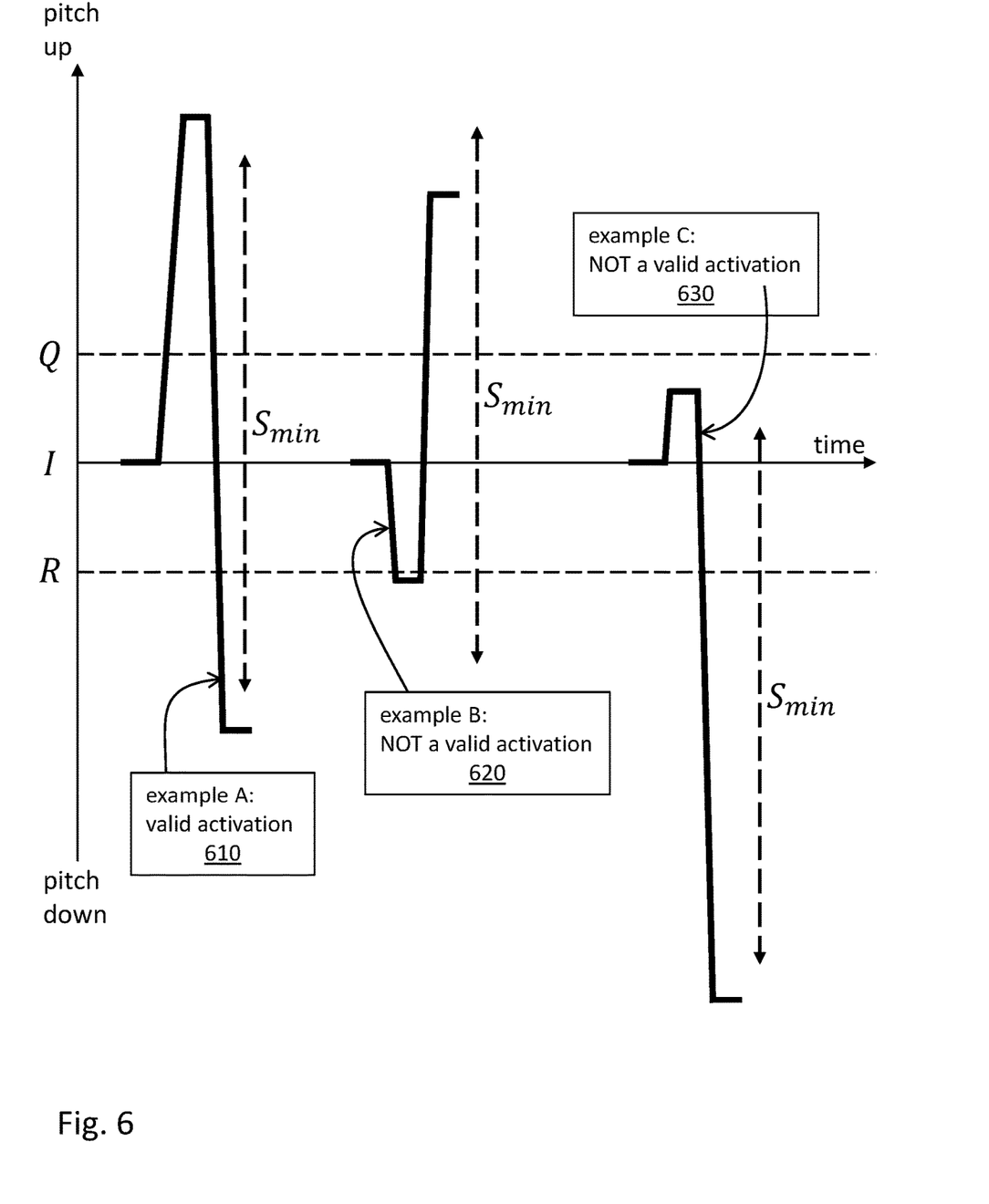
FIG. 6 is a timing diagram illustrating example eye motions in relation to gesture detection criteria.

FIG. 6 illustrates several examples 610, 620, 630 of motions plotted as changes in pitch over time. These graphs also illustrate pitch thresholds Q, R (wherein Q and R are offset in opposite directions from a starting pitch I) and a minimum span $S_{MIN}$. In these examples, a gesture is detected when (1) both the pitch of the eye motion crosses both thresholds Q and R, and (2) the total range of pitches (i.e., the span) during the motion exceeds the minimum span $S_{MIN}$. The minimum span $S_{MIN}$ may be configured to greater than the difference in pitch between the thresholds Q, R, i.e., $S_{MIN} > |O-R|$. In an example implementation, the pitch thresholds Q, R may each represent an offset of approximately 7 degrees from the starting pitch I and the minimum span $S_{MIN}$ may be, for example, 27 degrees. In alternative embodiments, different values may be used or the values may be user-configurable. Furthermore, the starting pitch I is not necessarily a predefined pitch but could represent any starting pitch from which the thresholds Q, R may be computed as relative offsets.

In Example A 610, the motion constitutes a valid activation associated with the gesture. Here, both pitch thresholds Q, R are crossed and the total span exceeds the minimum span $S_{MIN}$. Example B 620 illustrates an example of a motion that does not result in an activation associated with the gesture. In this case, both thresholds Q and R are crossed, but the minimum span $S_{MIN}$ criterion is not met. Example C 630 illustrates another example of a motion that fails to result in an activation associated with the gesture. Here, the minimum span $S_{MIN}$ is met and the threshold R is crossed, but the gesture fails because the threshold Q is not crossed.

Figure 7:
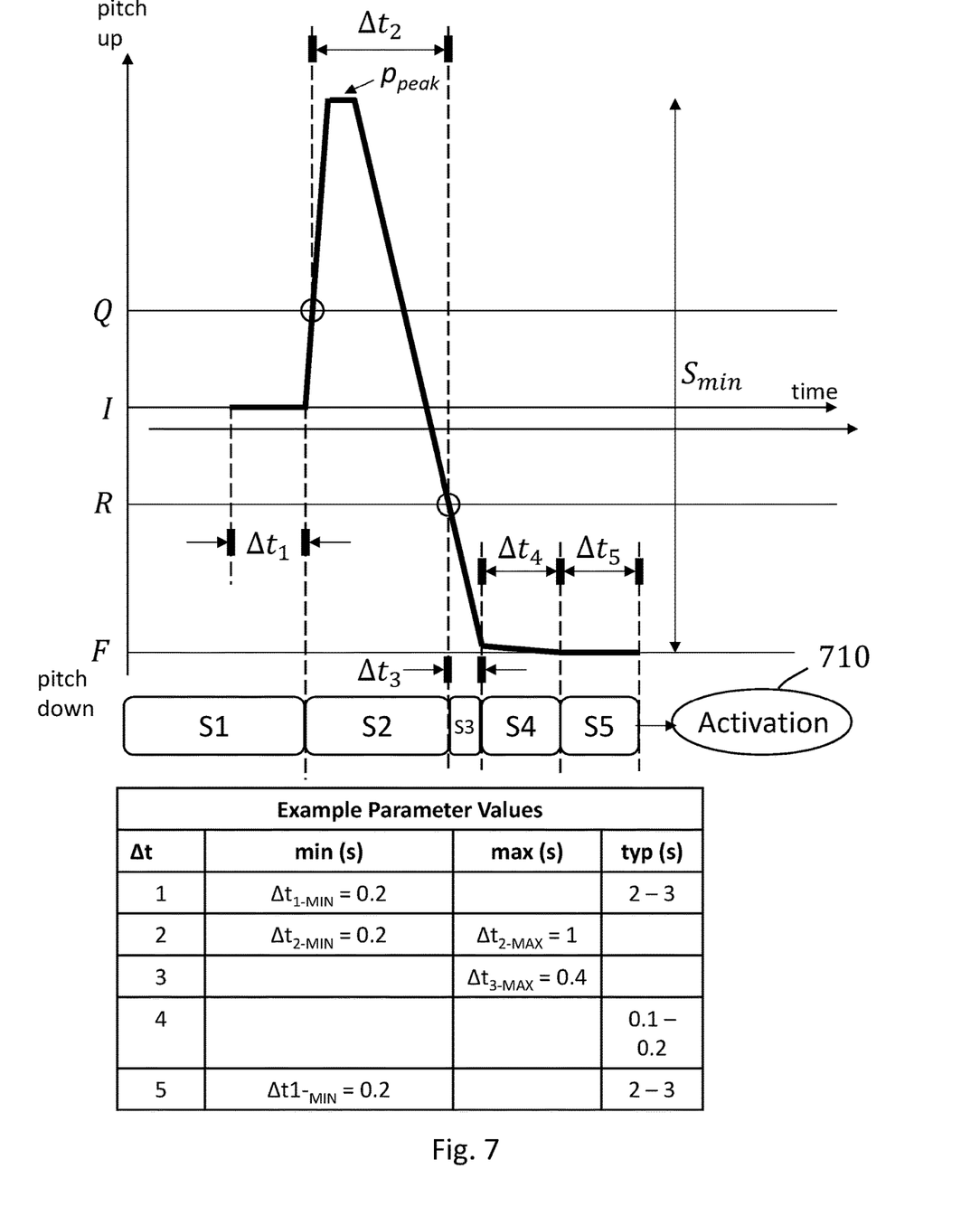
FIG. 7 is a timing diagram illustrating an example eye gesture in relation to gesture detection criteria in accordance with a state machine implementation.

FIG. 7 illustrates an example of a timing diagram associated with detection of an eye gesture using a state machine implementation. The chart in FIG. 7 specifies example values for different parameters for illustrative purposes. These values can vary in different implementations and/or may be user configurable. For example, the parameter values may be manually adjustable or may be dynamically adjusted based on a calibration process.

In a first state S1, the motion analysis module 202 detects when the eye meets a stability metric. For example, the motion analysis module 202 may determine that the stability metric is met when $\Delta t_1 > \Delta t_{1-MIN}$ where $\Delta t_1$ is a time window during which the variation in pitch stays within a predefined stability range (e.g., $I \pm \delta$ where I is an arbitrary starting pitch) and $\Delta t_{1-MIN}$ is a predefined time threshold. In an embodiment, the threshold $\Delta t_{1-MIN}$ may be set to, for example, $\Delta t_{1-MIN}=0.2$ seconds. In a typical gesture, the period $\Delta t_1$ may last, for example, 2-3 seconds. The starting pitch I is not necessarily a predefined pitch and may represent, for example, an average pitch during the stable period $\Delta t_1$ that may be computed once the stability metric is met. After determining the starting pitch I associated with the stable period $\Delta t_1$, the pitch offsets Q, R may be determined as predefined offsets from the starting pitch I. The state machine transitions from the first state S1 to the second state S2 after the stability metric is met and the pitch subsequently exits the stability range (e.g., crosses a pitch threshold I+6). In an embodiment the pitch threshold I+6 for transitioning to the second state S2 may be in between I and Q.

When in the second state S2, the motion analysis module 202 detects if the pitch crosses the first threshold Q and subsequently crosses the second threshold R such that the time between crossing Q and R is within a predefined time window. For example, the motion analysis module 202 detects if $\Delta t_{2-MIN} < \Delta t_2 < \Delta t_{2-MAX}$, where $\Delta t_2$ is the time between crossing threshold Q and threshold R, and $t_{2-MIN}$, $\Delta t_{2-MAX}$ are predefined time thresholds. In an example embodiment, the time window is defined as $\Delta t_{2-MIN}=0.2$ seconds and $\Delta t_{2-MAX}=1$ second. If the second state criteria is met, the state machine moves to the third state S3. If the second state criteria is not met within the maximum time $\Delta t_{2-MAX}$, the activation fails and the state machine may reset to the starting state S1.

In the third state S3, the motion analysis module 202 detects if the total span of the pitch exceeds a minimum span $S_{MIN}$ within a predefined time period. For example, the third state criteria is met if $p_{-PEAK} - p' > S_{MIN}$ (i.e., the span criterion is met) and $\Delta t_3 < \Delta t_{3-MAX}$ where $p_{-PEAK}$ is the peak pitch detected during the second state S2, $S_{MIN}$ is a predefined minimum span, $\Delta t_3$ is the time between crossing the R threshold and the span criterion being met, and $\Delta t_{3-MAX}$ is a predefined time limit. For example, in an embodiment, $\Delta t_{3-MAX}=0.4$ seconds. If the span criterion is not within the maximum time period $\Delta t_{3-MAX}$, the activation fails and the state machine may reset to the starting state S1.

In the 4$^{th}$ state S4, the motion analysis module 202 detects when the velocity of the pitch trajectory sufficiently slows or changes direction to indicate that the pitch is stabilizing. For example, the fourth state criteria may be met when $dp/dt < v_{MIN}$ or when $dp/dt$ changes sign, where $v_{MIN}$ is a predefined velocity threshold. The final pitch F is determined as the pitch when the fourth state criteria is met. In embodiment, state S4 is not constrained by a time limit.

In the 5$^{th}$ state S5, the motion analysis module 202 detects if an ending stability metric is met. Here, the ending stability criteria may be met when the pitch remains relatively stable (e.g., within a predefined pitch range) for at least a minimum time period, i.e., $\Delta t_5 > \Delta t_{5-MIN}$, where $\Delta t_5$ is the period of time that the pitch remains within a predefined pitch range of the ending pitch F determined in state S4 (e.g., the pitch remains in the range $F \pm \delta$ during the time period $\Delta t_5$) and $\Delta t_{5-MIN}$ is a predefined time threshold. In an example embodiment, the minimum time period is set as $\Delta t_{5-MIN}=0.2$ seconds. In a typical gesture, the time period $\Delta t_5$ may last, for example, 2-3 seconds. Once the ending criteria is met, the gesture is detected and the associated action may be activated 710.

In the example timing diagram of FIG. 7, the gesture involves an increase in pitch followed by a decrease in pitch. As explained above, a valid gesture could also involve a decrease in pitch followed by an increase in pitch. In this case, the state machine of FIG. 7 operates similarly but the pitch changes occur in opposite directions than those illustrated.

As described above, in an alternative implementation, the activation 710 does not necessarily occur when the criteria of state S5 is met. Instead, the motion analysis module 222 may generate a score for each state based on a set of target criteria that may be different than the criteria for transitioning between states. Then, upon reaching the end of the state machine, the motion analysis module 222 combines the scores (e.g., as an average or weighted sum) and compares the combined score to an activation threshold to determine whether or not the gesture is detected.

Furthermore, as described above, instead of evaluating different criteria during sequential states of a state machine, the motion analysis module 222 may instead evaluate an overall similarity metric of a set of samples captured over a time window against a target motion. The similarity metric may then be compared to a threshold to determine whether or not the gesture is detected.

Figure 8:
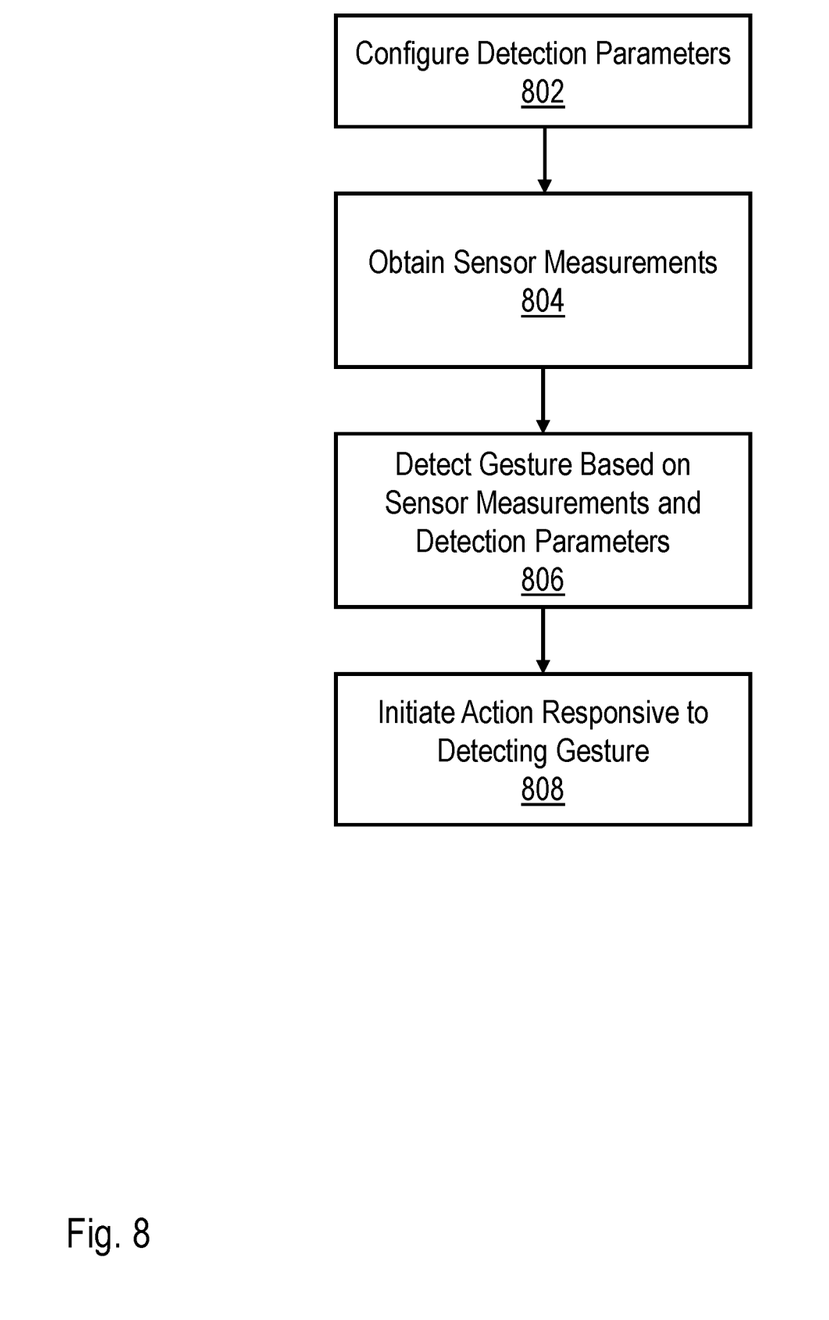
FIG. 8 is a flowchart illustrating an example embodiment of a process for controlling a function of an electronic contact lens responsive to a detected eye gesture.

FIG. 8 is a flowchart illustrating an example embodiment of a process for controlling an electronic contact lens system 200 based on a detected eye gesture. The electronic contact lens system 200 configures 802 detection parameters associated with detection of a gesture. The detection parameters may be defined as a pair of pitch offsets (Q, R) representing changes in pitch in opposite directions from an arbitrary starting position, a minimum span $S_{MIN}$, and a set of timing requirements. The electronic contact lens system obtains 804 sensor measurements from an electronic contact lens 110. The electronic contact lens system 200 detects 806 a gesture based on the sensor measurements and the detection parameters. As described above, the detection may occur when the sensor measurements describe a motion that sequentially crosses both the of the pitch offset, achieves the minimum span, and meets the various timing requirements. The electronic contact lens system 200 initiates 808 an action responsive to detecting the gesture. For example, the electronic contact lens system 200 may change the power state of the electronic lens 110 and/or initiate a user interface function.

In an alternative embodiment, the techniques described herein can apply to an augmented, virtual reality system, or a displayless eye-tracking system that is not necessarily embodied as an electronic contact lens 110. For example, in an embodiment, the described eye gestures can be recognized by a glasses-type augmented reality device or a different type of head-mounted device. In these embodiments, motion data may be captured from an eye-facing camera integrated in the head-mounted device instead of from motion sensors mounted directly to the eye. Here, images captured from the integrated camera are processed to estimate eye movements and to detect gestures from those eye movements using the same techniques described above in FIGS. 3-8. In yet further embodiments, a different eye tracking system may be used that is not necessarily camera-based. For example, a light scanning system may track eye movements by scanning light across the eye and detecting reflections using a light sensor. In any of the above embodiments, the eye gestures may be used to control functions of the head-mounted device or an external system similar to those described above, such as switching between power states and/or interacting with virtual menus or other objects.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software and/or combinations thereof. Implementations can be implemented in a computer program product tangibly embodied in a non-transitory computer-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from and to transmit data and instructions to, a data storage system, at least one input device and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Any of the foregoing can be supplemented by, or incorporated in, ASICs (application-specific integrated circuits) and other forms of hardware.

The invention claimed is:

1. A method for initiating an action responsive to identifying an eye gesture of an eye, the method comprising:
   configuring a first pitch offset in a first direction from an initial pitch and a second pitch offset in a second direction from the initial pitch, wherein the second direction is opposite the first direction;
   obtaining sensor measurements representing eye movement;
   detecting an activation gesture based on the sensor measurements, wherein detecting the activation gesture includes detecting an eye motion that meets motion and timing constraints associated with a sequence of motion segments including stabilizing at an initial pitch, crossing the first pitch offset in a first direction, crossing the second pitch offset in a second direction, and stabilizing at an ending pitch, and wherein detecting the activation gesture further comprises:
      tracking a peak pitch at a maximum offset reached from the initial pitch after crossing the first pitch offset and before crossing the second pitch offset and
      detecting that the eye achieves at a least a minimum span from the peak pitch within a third predefined time period from the eye crossing the second pitch offset; and
   initiating an action responsive to the activation gesture.

2. The method of claim 1, wherein the minimum span is greater in magnitude than a difference in pitch between the first pitch offset and the second pitch offset.

3. The method of claim 1, wherein detecting the activation gesture comprises:

tracking a state of a state machine, wherein each state evaluates the eye movement with respect to a subset of the motion and timing constraints to determine state transitions.

4. The method of claim 3, wherein the state machine transitions from a given state to a subsequent state only when the subset of the motion and timing constraints for the given state is met, and wherein detecting the activation gesture comprises reaching a final state of the state machine.

5. The method of claim 3, wherein the state machine transitions from a given state to a subsequent state when state transition criteria is met, and wherein detecting the activation gesture comprises:
   determining respective scores associated with each state with respect to target criteria; and
   detecting the activation gesture based on a combination of the respective scores.

6. The method of claim 1, wherein detecting the activation gesture further comprises:
   evaluating samples of the sensor measurements over a prior time window to determine a similarity metric relative to a target motion; and
   detecting the activation gesture based on the similarity metric.

7. The method of claim 1, wherein obtaining the sensor measurements comprises:
   obtaining the sensor measurements from an accelerometer of an electronic contact lens.

8. The method of claim 1, wherein initiating the action comprises:
   transitioning at least one of a gyroscope and a magnetometer from an inactive state to an active state.

9. The method of claim 1, wherein obtaining the sensor measurements comprises:
   obtaining the sensor measurements a sensor integrated in a head-mounted display device.

10. A non-transitory computer-readable storage medium storing instructions for initiating an action responsive to identifying an eye gesture, the instructions when executed by one or more processors causing the one or more processors to perform steps comprising:
    configuring a first pitch offset in a first direction from an initial pitch and a second pitch offset in a second direction from the initial pitch, wherein the second direction is opposite the first direction;
    obtaining sensor measurements representing eye movement;
    detecting an activation gesture based on the sensor measurements, wherein detecting the activation gesture includes detecting an eye motion that meets motion and timing constraints associated with a sequence of motion segments including stabilizing at an initial pitch, crossing the first pitch offset in a first direction, crossing the second pitch offset in a second direction, and stabilizing at an ending pitch, and wherein detecting the activation gesture further comprises:
       tracking a peak pitch at a maximum offset reached from the initial pitch after crossing the first pitch offset and before crossing the second pitch offset and
       detecting that the eye achieves at a least a minimum span from the peak pitch within a third predefined time period from the eye crossing the second pitch offset; and
    initiating an action responsive to the activation gesture.

11. The non-transitory computer-readable storage medium of claim 10, wherein the minimum span is greater in magnitude than a difference in pitch between the first pitch offset and the second pitch offset.

12. The non-transitory computer-readable storage medium of claim 10, wherein detecting the activation gesture comprises:
tracking a state of a state machine, wherein each state evaluates the eye movement with respect to a subset of the motion and timing constraints to determine state transitions.

13. The non-transitory computer-readable storage medium of claim 12, wherein the state machine transitions from a given state to a subsequent state only when the subset of the motion and timing constraints for the given state is met, and wherein detecting the activation gesture comprises reaching a final state of the state machine.

14. The non-transitory computer-readable storage medium of claim 12, wherein the state machine transitions from a given state to a subsequent state when state transition criteria is met, and wherein detecting the activation gesture comprises:
determining respective scores associated with each state with respect to target criteria; and
detecting the activation gesture based on a combination of the respective scores.

15. The non-transitory computer-readable storage medium of claim 10, wherein detecting the activation gesture further comprises:
evaluating samples of the sensor measurements over a prior time window to determine a similarity metric relative to a target motion; and
detecting the activation gesture based on the similarity metric.

16. An electronic contact lens system comprising:
an electronic contact lens mountable to an eye, the electronic contact lens having at least one motion sensor for obtaining sensor measurements representing sensed motion of the eye;
a processing device comprising:
a processor; and
a non-transitory computer-readable storage medium for storing instructions executable by the processor, the instructions when executed causing the processor to perform steps including:
configuring a first pitch offset in a first direction from an initial pitch and a second pitch offset in a second direction from the initial pitch, wherein the second direction is opposite the first direction;
obtaining sensor measurements representing eye movement;
detecting an activation gesture based on the sensor measurements, wherein detecting the activation gesture includes detecting an eye motion that meets motion and timing constraints associated with a sequence of motion segments including stabilizing at an initial pitch, crossing the first pitch offset in a first direction, crossing the second pitch offset in a second direction, and stabilizing at an ending pitch, and wherein detecting the activation gesture further comprises:
tracking a peak pitch at a maximum offset reached from the initial pitch after crossing the first pitch offset and before crossing the second pitch offset; and
detecting that the eye achieves at a least a minimum span from the peak pitch within a third predefined time period from the eye crossing the second pitch offset; and
initiating an action responsive to the activation gesture.

17. The electronic contact lens system of claim 16, wherein the minimum span is greater in magnitude than a difference in pitch between the first pitch offset and the second pitch offset.

\* \* \* \* \*